Patented Sept. 4, 1951

2,566,623

UNITED STATES PATENT OFFICE 2,566,623

HYDRAULIC FLUID COMPOSITION

Douglas H. Moreton, Pacific Palisades, Calif., assignor to Douglas Aircraft Company, Inc., Santa Monica, Calif.

No Drawing. Application April 6, 1948,
Serial No. 19,439

8 Claims. (Cl. 252—78)

This invention relates to a fluid composition useful particularly for transmitting power in hydraulic power systems and especially a non-flammable hydraulic fluid for use in the hydraulic systems of aircraft.

A number of fluids are known which are intended for use to transmit power in hydraulic systems. However, aircraft hydraulic power systems for operating various mechanisms of an airplane impose stringent requirements on the fluid used. The viscosity characteristics of the fluid must be such that it may be used over a wide temperature range. It must not affect adversely the materials of which the system is constructed. It must possess sufficient lubricity and mechanical stability to enable it to be used in the self-lubricated pumps, valves, et cetera employed, and it should not be abnormally toxic or harmful to personnel who come in contact with it. Thus, the exacting demands of the hydraulic systems of aircraft are many and particularly include a high lubricity to effectively lubricate moving parts of the system, satisfactory viscosity at low as well as high temperatures at which the aircraft may have to operate, that is, high viscosity index, stability under conditions of use against loss of the desired characteristics due to high and sudden changes of pressure, temperature, high shearing stresses, non-corrosiveness to metal parts which may be of aluminum, bronze, steel, et cetera, and the property of not deteriorating gaskets or packings. But in addition to all these requisites for aircraft use, the fluid must also be highly non-flammable.

Numerous hydraulic fluid mixtures have been suggested. Light petroleum oil fractions to which suitable pour point depressants, viscosity index improvers, inhibitors, et cetera have been added are among the best so far proposed and these have been used somewhat extensively as aircraft hydraulic fluids. These materials, however, are too readily flammable, have a low autogenous ignition temperature, burn readily once ignited and have a high heat value. These characteristics are particularly undesirable in aircraft where necessity dictates the use of hydraulic lines in close proximity to electrical systems and to engines where a leakage of hydraulic fluid at high pressure through a crash of the airplane or failure of the hydraulic system while in flight may result in fire. None of these prior materials will meet the requirements of an aircraft hydraulic fluid and at the same time be sufficiently non-flammable to meet this exceedingly important requirement for aircraft use.

In accordance with this invention, the discovery has been made that a hydraulic fluid surprisingly satisfactory for aircraft hydraulic systems can be made by compounding a triaryl or diaryl phosphate, such as tricresyl phosphate, for example, with a suitable trialkyl phosphate, such as tri-(2-ethyl hexyl) phosphate, for example, or a suitable tri-aliphatic phosphate, such as tributoxyethyl phosphate, for example.

The aryl phosphates suitable for the purposes of my invention are those phosphates having three hydrocarbon radicals, at least two of which radicals are aryl radicals having from 6 to 8 carbon atoms, where any alkyl substituent on the aromatic nucleus is no greater than a methyl group, and the other hydrocarbon radical is either such an aryl group having at least one methyl substituent or a saturated alkyl group having from 6 to 10 carbon atoms. These aryl phosphates particularly include such triaryl phosphates as tricresyl phosphate, cresyl diphenyl phosphate, trixylyl phosphate and xylyl diphenyl phosphate, as examples, and such monoalkyl diaryl phosphates as octyl dicresyl phosphate, octyl diphenyl phosphate, octyl cresyl phenyl phosphate, nonyl diphenyl phosphate, and octyl dixylyl phosphate, as examples. As herein used, the term "cresyl" indicates the tolyl or methylphenyl radical and "xylyl" the dimethylphenyl radical. The aromatic phosphates particularly suitable for the purposes of this invention may be represented by the formula

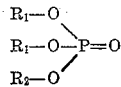

where $R_1$ is phenyl, cresyl or xylyl and $R_2$ is cresyl, xylyl or a saturated alkyl group having from 6 to 10 carbon atoms.

The tri-aliphatic phosphates suitable for compounding with the aromatic phosphates pointed out above particularly include trialkyl phosphates, the alkyl groups of which are saturated and branched chain with from 4 to 9 carbon atoms, such as tri(2-ethyl hexyl) phosphate and triisononyl phosphate (where the isononyl groups are $Me_3C.CH_2(CH.CH_3)CH_2.CH_2$—), as examples, and those trialkyl phosphates the alkyl groups of which are saturated and straight chain with from 4 to 6 carbon atoms, that is, n-butyl, n-amyl and n-hexyl, particularly tri-n-butyl phosphate and tri-n-hexyl phosphate, and such tri-aliphatic phosphates as tributoxyethyl phosphate, for example.

The following examples will illustrate my invention:

Example 1

50% by volume tricresyl phosphate
50% by volume tri(2-ethyl hexyl) phosphate

The resulting composition was found to have the following properties:

Pour point, −45° F.

| Viscosity at— | Centistokes |
|---|---|
| 210° F | 3.1 |
| 100° F | 15.8 |
| −30° F | 8,233 |

Autogenous ignition temperature: Glass, 890° F.

Example 2

60% by volume tricresyl phosphate
40% by volume tri(2-ethyl hexyl) phosphate
Pour point, −40° F.

| Viscosity at— | Centistokes |
|---|---|
| 210° F | 3.28 |
| 100° F | 18.1 |

Autogenous ignition temperature: Glass, 930° F.

Example 3

70% by volume tricresyl phosphate
30% by volume tri(2-ethyl hexyl) phosphate
Pour point, −40° F.

| Viscosity at— | Centistokes |
|---|---|
| 210° F | 3.36 |
| 100° F | 18.6 |

Autogenous ignition temperature: Glass, 980° F.

Usually from about 20 to 60 volume per cent of the tri-aliphatic phosphate will be found satisfactory for compounding with the aromatic phosphate in accordance with my invention, and from 25 to 40 per cent is preferred.

It will be understood by those skilled in the art to which my invention appertains that additives, such as an oxidation inhibitor, for example, may be incorporated in the compositions of my invention, if desired.

I claim:

1. A non-flammable hydraulic fluid for dynamic hydraulic systems of aircraft having good low temperature properties and having an autogenous ignition temperature above 890° F. and a pour point lower than −40° F. consisting of an organic phosphate having three hydrocarbon radicals, two of which are members of the group consisting of phenyl, cresyl and xylyl radicals and the other hydrocarbon radical a member of the group consisting of cresyl, xylyl and a saturated alkyl radical having from 6 to 10 carbon atoms; and a relative proportion of from 20 to 60 volume per cent of a tri-aliphatic phosphate compounded therewith selected from the group consisting of trialkyl phosphates in which the alkyl groups are saturated branched chains with from 4 to 9 carbon atoms, trialkyl phosphates in which the alkyl groups are saturated straight chains with from 4 to 6 carbon atoms, and tributoxyethyl phosphate.

2. The composition as defined in claim 1 in which said aromatic phosphates are triaryl phosphates.

3. The composition as defined in claim 1 in which said aromatic phosphates are triaryl phosphates and said tri-aliphatic phosphates are trialkyl phosphates in which the alkyl groups are branched chains with from 4 to 9 carbon atoms.

4. The composition as defined in claim 1 in which said aromatic phosphates are triary phosphates and said tri-aliphatic phosphates are trialkyl phosphates in which the alkyl groups are straight chains having from 4 to 6 carbon atoms.

5. The composition as defined in claim 1 in which said aromatic phosphates are triaryl phosphates and said tri-aliphatic phosphate is tributoxyethyl phosphate.

6. A fluid as defined in claim 1 in which said phosphates are tricresyl phosphate and tri(2-ethyl hexyl) phosphate.

7. A fluid as defined in claim 1 in which said phosphates are tricresyl phosphate and tri(2-ethyl hexyl) phosphate and in which the relative proportion of the tri(2-ethyl hexyl) phosphate is from 25 to 40 volume per cent.

8. A fluid as defined in claim 1 in which said phophates are cresyl diphenyl phosphate and tri-(2-ethyl hexyl) phosphate.

DOUGLAS H. MORETON.

REFERENCES CITED

The following references are of record in the file of this patent:

UNITED STATES PATENTS

| Number | Name | Date |
|---|---|---|
| 1,976,716 | Custer | Oct. 16, 1934 |
| 2,237,336 | Caprio | Apr. 8, 1941 |
| 2,241,531 | Wiezevich | May 13, 1941 |
| 2,245,649 | Caprio | June 17, 1941 |
| 2,249,800 | Weber | July 22, 1941 |
| 2,390,258 | Katz et al. | Dec. 4, 1945 |
| 2,410,608 | Morgan | Nov. 5, 1946 |